US012673597B2

(12) United States Patent
Lee et al.

(10) Patent No.: US 12,673,597 B2
(45) Date of Patent: Jul. 7, 2026

(54) SEAT CONTROLLING APPARATUS AND METHOD

(71) Applicants: HYUNDAI MOTOR COMPANY, Seoul (KR); KIA CORPORATION, Seoul (KR)

(72) Inventors: Dong Hoon Lee, Hwaseong-si (KR); Kug Hun Han, Hwaseong-si (KR); Yo Han Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 83 days.

(21) Appl. No.: 18/925,595

(22) Filed: Oct. 24, 2024

(65) Prior Publication Data

US 2025/0313139 A1 Oct. 9, 2025

(30) Foreign Application Priority Data

Apr. 9, 2024 (KR) ........................ 10-2024-0048159

(51) Int. Cl.
*B60N 2/90* (2018.01)
*B60N 2/02* (2006.01)
*B60N 2/30* (2006.01)

(52) U.S. Cl.
CPC ......... *B60N 2/919* (2018.02); *B60N 2/02246* (2023.08); *B60N 2/0272* (2023.08); *B60N 2/3009* (2013.01); *B60N 2002/924* (2018.02); *B60N 2002/948* (2018.02)

(58) Field of Classification Search
None
See application file for complete search history.

(56) References Cited

U.S. PATENT DOCUMENTS

| | | | | |
|---|---|---|---|---|
| 4,596,420 A | * | 6/1986 | Vaidya | B60N 2/3084 |
| | | | | 297/238 |
| 6,217,096 B1 | * | 4/2001 | Koiwa | B60N 2/3011 |
| | | | | 296/65.09 |
| 7,300,105 B2 | * | 11/2007 | Jasinski | B60N 3/004 |
| | | | | 297/125 |
| 7,562,931 B2 | * | 7/2009 | Stojanovic | B60N 2/36 |
| | | | | 296/37.16 |
| 10,232,747 B2 | * | 3/2019 | Line | B60N 2/32 |
| 10,884,614 B1 | * | 1/2021 | Austria | G06F 3/04883 |
| 11,155,185 B2 | * | 10/2021 | Rose | B60N 2/757 |
| 2007/0273177 A1 | * | 11/2007 | Sankrithi | B62D 33/04 |
| | | | | 296/181.1 |
| 2011/0012386 A1 | * | 1/2011 | Brncick | B60N 2/986 |
| | | | | 296/64 |
| 2019/0106034 A1 | * | 4/2019 | Leon Guerrero | B60N 2/3045 |
| 2020/0017000 A1 | * | 1/2020 | Lee | B60N 2/0244 |

(Continued)

*Primary Examiner* — Christian Chace
*Assistant Examiner* — Scott R Jagolinzer
(74) *Attorney, Agent, or Firm* — Lempia Summerfield Katz LLC

(57) ABSTRACT

A seat controlling apparatus includes a driving part, a memory, and a controller. The seat controlling apparatus may: fold a first seat using the driving part when receiving a folding input for the first seat; determine whether a partition wall adjacent to the first seat satisfies an unfolding condition while the first seat is folded; and unfold the partition wall such that one surface of the partition wall faces a second seat adjacent to the first seat when the partition wall satisfies the unfolding condition.

16 Claims, 14 Drawing Sheets

(56)                    References Cited

U.S. PATENT DOCUMENTS

2021/0129718  A1*    5/2021   Hunsaker ................. B60N 2/26
2022/0017002  A1*    1/2022   Park ..................... B60N 2/3011
2022/0105891  A1*    4/2022   Nilsson ................. B60N 2/206
2023/0012605  A1*    1/2023   Curatola ................. B60J 7/223

* cited by examiner

720

725

SEAT CONTROLLING APPARATUS AND METHOD

CROSS-REFERENCE TO RELATED APPLICATION

This application claims the benefit of and priority to Korean Patent Application No. 10-2024-0048159, filed on Apr. 9, 2024, the entire contents of which are incorporated herein by reference.

TECHNICAL FIELD

The present disclosure relates to a seat controlling apparatus and a method therefor.

BACKGROUND

With the development of technology, various components may be operatively connected inside a vehicle. In particular, a seat controlling apparatus may quickly and accurately provide various functions by performing cooperative control between the components for user convenience.

A plurality of seats may be mounted inside the vehicle itself. Furthermore, at least one device is provided to optimize the interior environment for a user seated in each of the plurality of seats. For example, in the case of a vehicle in which two rows of seats are arranged, a seat (e.g., an LH seat) behind a passenger seat among the two rows of seats corresponds to a seat that may be observed and cared by a driver through a rear-view mirror. Additionally, in the case of a luxury sedan, there is a trend towards applying a technology to enhance the environment for users seated in corresponding seat.

For example, in the case of a luxury sedan, a technology for implementing a more luxurious and comfortable space for the user sitting on a rear seat (e.g., a second-row seat) is being actively developed.

There may be limitations in mounting usability devices for the user due to space restrictions inside the vehicle. Furthermore, in vehicles with two rows of seats, there may be limitations in providing usability devices to maximize the space between a second-row seat and a trunk.

The statements in this section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a seat controlling apparatus that provides a luxurious and cozy space sense to a user sitting on a seat (e.g., a seat behind a passenger seat) adjacent to a specified seat behind a driver seat among two-row seats. This is achieved by unfolding a partition wall disposed on a rear surface of a seatback of the specified seat when the specified seat is folded.

Another aspect of the present disclosure provides a seat controlling apparatus that selectively provides a partition wall according to intention of a user by fixing the partition wall to a rear surface of the seatback of a specified seat when the user applies a pressure input to the partition wall.

Still another aspect of the present disclosure provides a seat controlling apparatus that unfolds a partition wall to divide a space between a specified seat and a seat behind a driver seat. As a result, the seat controlling apparatus provides a personal space sense to a user sitting on a seat behind a passenger seat and provides luxurious and comfortable usability for a rear seat.

The technical problems to be solved by the present disclosure are not limited to the aforementioned problems. Any other technical problems not mentioned herein should be clearly understood from the following description by those having ordinary skill in the art to which the present disclosure pertains. According to an aspect of the present disclosure, a seat controlling apparatus includes: a driving part; a memory that stores one or more instructions; and a controller operatively connected to the driving part and the memory. For example, when the one or more instructions are executed by the controller, the seat controlling apparatus may fold a first seat using the driving part when receiving a folding input for the first seat. The controller may also determine whether a partition wall adjacent to the first seat satisfies an unfolding condition while the first seat is being folded, and unfold the partition wall such that one surface of the partition wall faces a second seat adjacent to the first seat when the partition wall satisfies the unfolding condition.

According to an embodiment, the seat controlling apparatus may further include at least one spring hinge connecting a backrest of the first seat and the partition wall, and an angle adjusting device disposed between the backrest and the partition wall. For example, the partition wall may be unfolded by the at least one spring hinge, and the unfolding of the partition wall may be stopped at a specified unfolding angle by the angle adjusting device when the unfolding condition is satisfied.

According to the embodiment, the partition wall may be fixedly coupled to the backrest through a locking device on a side opposite to the other side on which the angle adjusting device is disposed, based on user input having a specified pressure on the one surface.

According to the embodiment, when the instructions are executed by the controller, the seat controlling apparatus may unfold the first seat using the driving part when receiving an unfolding input for the first seat. For example, the coupling between the partition wall and the backrest may be released through an unlocking device adjacent to the locking device when the first seat is unfolded.

According to the embodiment, when the instructions are executed by the controller, the seat controlling apparatus may unfold the first seat using the driving part when receiving an unfolding input for the first seat. For example, while the first seat is being unfolded, the partition wall may be folded in proportion to an angle at which the first seat is unfolded through a pressure on the angle adjusting device.

According to the embodiment, the seat controlling apparatus may further include a damper. For example, a speed at which the partition wall is unfolded may be gently adjusted by the damper.

According to the embodiment, when the instructions are executed by the controller, the seat controlling apparatus may determine that the folding input is received when receiving a switch input for folding the first seat from a user or identifying that the first seat is folded by the user.

According to the embodiment, the driving part may include a gear disposed between a first side of a backrest of the first seat and a second side of the partition wall and a motor for rotation of the gear. When the instructions are executed by the controller, the seat controlling apparatus may unfold the partition wall using the gear and the motor when the partition wall satisfies the unfolding condition.

According to the embodiment, the seat controlling apparatus may further include a sensor part disposed between the partition wall and a backrest of the first seat. For example, when the instructions are executed by the controller, the seat controlling apparatus may stop the unfolding of the partition wall when it is identified using the sensor part that the partition wall is spaced a specified distance or less from the backrest.

According to the embodiment, the seat controlling apparatus may further include a sensor part disposed between the partition wall and a backrest of the first seat. For example, when the instructions are executed by the controller, the seat controlling apparatus may stop the unfolding of the partition wall when it is identified using the sensor part that the partition wall is unfolded at a specified angle.

According to the embodiment, when the instructions are executed by the controller, the seat controlling apparatus may determine that the partition wall does not satisfy the unfolding condition when occurrence of interference with an external object is expected when the partition wall is unfolded while the first seat is being folded.

According to the embodiment, when the instructions are executed by the controller, the seat controlling apparatus may determine that the partition wall satisfies the unfolding condition when receiving a user input for the unfolding of the partition wall while the first seat is being folded.

According to the embodiment, the seat controlling apparatus may further include a display part formed on the one surface of the partition wall. For example, when the instructions are executed by the controller, the seat controlling apparatus may provide at least one content to a user of the second seat using the display part provided to face the second seat.

According to the embodiment, the driving part may include a gear disposed between a first side of a backrest of the first seat and a second side of the partition wall and a motor for rotation of the gear. For example, when the instructions are executed by the controller, the seat controlling apparatus may unfold the first seat using the driving part when an unfolding input for the first seat is received after the first seat is folded and the partition wall is unfolded. Additionally, the seat controlling apparatus may move the other surface opposite to the one surface of the partition wall in a direction in contact with the backrest using the gear and the motor while the first seat is being unfolded.

According to the embodiment, when the instructions are executed by the controller, the seat controlling apparatus may monitor a folding angle of the first seat and determine whether the partition wall satisfies the unfolding condition based on the monitored folding angle.

According to another aspect of the present disclosure, there is provided a seat controlling method including folding, by a controller, a first seat using a driving part when receiving a folding input for the first seat. The method may also include: determining, by the controller, whether a partition wall adjacent to the first seat satisfies an unfolding condition while the first seat is being folded (i.e., while the first seat is in the process of being folded); and unfolding, by the controller, the partition wall such that one surface of the partition wall faces a second seat adjacent to the first seat when the partition wall satisfies the unfolding condition.

According to the embodiment, the seat controlling method may further include stopping, by the controller, the unfolding of the partition wall when it is identified using a sensor part that the partition wall is spaced a specified distance or less from a backrest of the first seat.

According to the embodiment, the seat controlling method may further include stopping, by the controller, the unfolding of the partition wall when it is identified using a sensor part that the partition wall is unfolded at a specified angle.

According to the embodiment, the seat controlling method may include determining, by the controller, that the partition wall does not satisfy the unfolding condition when occurrence of interference with an external object is expected when the partition wall is unfolded while the first seat is being folded.

According to the embodiment, the seat controlling method may further include unfolding, by the controller, the first seat using the driving part when receiving an unfolding input for the first seat after the first seat is folded and the partition wall is unfolded. Additionally, the seat controlling method may further include moving the other surface opposite to the one surface of the partition wall in a direction in contact with the backrest using the gear and the motor while the first seat is being unfolded.

BRIEF DESCRIPTION OF THE DRAWINGS

The above and other objects, features, and advantages of the present disclosure should be more apparent from the following detailed description taken in conjunction with the accompanying drawings.

In connection with the description of the drawings, the same or similar components may be designated by the same or similar reference numerals.

DETAILED DESCRIPTION

Figure 1:
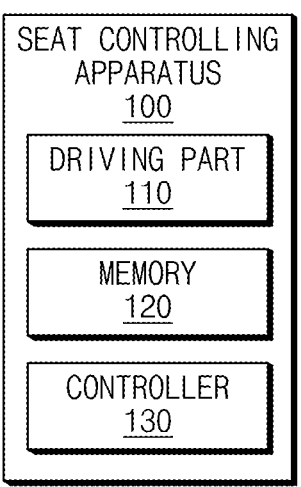
FIG. 1 is a block diagram illustrating components of a seat controlling apparatus according to an embodiment of the present disclosure.

Embodiments of the present disclosure are described in detail with reference to the drawings. In adding reference numerals to components of each drawing, it should be noted that identical or equivalent components are designated by identical numerals even when they are displayed on other drawings. Further, in describing the embodiments of the present disclosure, a detailed description of the related known configuration or function has been omitted when it was determined that the detailed description interferes with the understanding of the embodiment of the present disclosure.

In the description of the components of the embodiments of the present disclosure, terms such as first, second, A, B, (a), and (b) may be used. These terms are merely intended to distinguish one component from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus Hereinafter, embodiments of the present disclosure are described in detail with reference to FIGS. 1-8.

FIG. 1 is a block diagram illustrating components of a seat controlling apparatus according to an embodiment of the present disclosure.

According to the embodiment, a seat controlling apparatus 100 may include at least one of a driving part 110, a memory 120, or a controller 130, or any combination thereof. A configuration of the seat controlling apparatus 100 illustrated in FIG. 1 is illustrative, and embodiments of the present disclosure are not limited thereto. For example, the seat controlling apparatus 100 may further include components (e.g., at least one of an input part, an interface, a communication part, a notification part, a driving part, a display part, or a sensor part, or any combination thereof) not illustrated in FIG. 1.

According to the embodiment, the driving part 110 may include a plurality of driving parts that adjust a position (or a state) of a seat.

For example, the driving part 110 may mean a seat itself. In other words, the driving part 110 may include a dynamic system itself of the seat, which may adjust at least one of a reclining angle (or a backrest angle), a slide position, a headrest angle, a leg rest angle, a swivel angle, or any combination thereof.

For example, the driving part 110 may include a plurality of driving parts that control the positions of a plurality of seats arranged in a vehicle itself. The plurality of driving parts may include, for example, at least one of a tilting motor that adjusts a tilting angle of the seat, a reclining motor that adjusts the backrest angle (or a folding angle) of the seat, a leg rest motor that adjusts an angle of a leg rest of the seat, or a slide motor that adjusts a slide position of the seat, or any combination thereof.

For example, the controller 130 may perform slide control of moving the seat in a front-rear direction using the driving part 110, perform swivel control of rotating the seat about a vertical axis at a specified angle within 360 degrees, or perform reclining control of folding or unfolding a seatback (or a backrest) using the reclining motor.

For example, the driving part 110 may further include various components arranged between the seatback and a partition wall. As an example, the driving part 110 may include a gear disposed between a first side of the backrest of the seat and a second side of the partition wall. As an example, the driving part 110 may include a motor disposed to rotate the gear. As an example, the driving part 110 may include at least one spring hinge connecting the backrest of the seat and the partition wall. As an example, the driving part 110 may further include an angle adjusting device disposed between the backrest and the partition wall. The partition wall (or a third side opposite to the second side of the partition wall) disposed adjacent to the seat may be unfolded in a direction way from the seatback through a driving mechanism of the driving part 110.

According to the embodiment, the memory 120 may store commands or data. For example, the memory 120 may store one or more instructions that cause the seat controlling apparatus 100 to perform various operations when the seat controlling apparatus 100 is executed by the controller 130.

For example, the memory 120 together with the controller 130 may be implemented into one chipset. The controller 130 may include at least one of a communication processor or a modulator and demodulator (MODEM).

According to the embodiment, the controller 130 may be operatively connected to at least one of the driving part 110, or the memory 120, or any combination thereof. For example, the controller 130 may control an operation of at least one of the driving part 110, the memory 120, or any combination thereof. For example, when receiving a folding input for a first seat, the controller 130 may fold the first seat using the driving part 110.

For example, the first seat may be a second row seat disposed behind a first row driver seat.

As an example, when receiving a switch input related to the folding of the first seat, the controller 130 may fold the first seat. For example, the switch input may fold the seatback (or the backrest) of the first seat so that the seatback comes into contact with a cushion (e.g., a cushion provided for sitting of the user).

As an example, when it is identified that the first seat is folded by the user, the controller 130 may determine that the folding input is received. The controller 130 may monitor a position of the first seat in real time using at least one sensor and identify that the first seat is folded by a user's force. In this case, the controller 130 may determine that the folding input for the first seat is received.

For example, while the first seat is in the process of being folded, the controller 130 may determine whether the partition wall adjacent to the first seat satisfies an unfolding condition.

As an example, when the partition wall is unfolded using at least one sensor, the controller 130 may determine whether the unfolding condition of the partition wall is satisfied based on whether the first seat or the partition wall is expected to collide with an external object (e.g., the user, the seat, an object, or the like). For example, when the partition wall is unfolded while the first seat is being folded, the controller 130 may determine that the partition wall does not satisfy the unfolding condition when it is expected that interference (or collision) between the first seat or the partition wall and an external object occurs. For example, when the partition wall is unfolded while the first seat is being folded, the controller 130 may determine that the partition wall satisfies the unfolding condition when it is expected that interference (or collision) between the first seat or the partition wall and an external object does not occur.

As an example, when receiving a user input related to the unfolding of the partition wall while the first seat is being folded, the controller 130 may determine that the partition wall satisfies the unfolding condition. The user input related to the unfolding of the partition wall may include, for example, an input for a partition wall unfolding switch (e.g., a touch input or a pressure input). When receiving the user input related to the unfolding of the partition wall, the controller 130 may determine that the partition wall satisfies the unfolding condition regardless of whether there is interference with an external object.

As an example, the controller 130 may monitor a folding angle of the first seat and determine whether the partition wall satisfies the unfolding condition based on a size of the monitored folding angle. For example, when the seatback of the first seat is gradually further folded toward the cushion, the controller 130 may determine that the unfolding condition is satisfied.

For example, when the partition wall satisfies the unfolding condition, the controller 130 may unfold the partition wall such that one surface of the partition wall faces a second seat adjacent to the first seat.

As an example, the second seat may include a seat that is present on a lateral side of the first seat. The second seat may include, for example, a seat disposed behind a passenger seat. The controller 130 may unfold the partition wall such that the one surface of the partition wall opposite to a surface adjacent to the backrest is unfolded toward the second seat.

As an example, the controller 130 may unfold the partition wall using a gear and a motor. For example, the controller 130 may rotate the gear by driving the motor connected to the gear (e.g., a pinion gear) disposed between the first side of the backrest and the second side of the partition wall of the first seat and thus may unfold the partition wall through the rotation of the gear.

As an example, the controller 130 may monitor an amount of the partition wall being unfolded and determine whether to stop the unfolding based on the extent of the unfolding amount.

For example, the controller 130 may monitor a separation distance between the partition wall and the backrest (or the seatback) using the sensor part. When it is identified that the partition wall is spaced a specified distance or less from the backrest, the controller 130 may stop the unfolding of the partition wall. Alternatively, when it is identified that the partition wall is in contact with the backrest through the sensor part (e.g., a contact sensor disposed in one area of the backrest or the partition wall), the controller 130 may stop the unfolding of the partition wall. In other words, even when the unfolding condition of the partition wall is satisfied, when the partition wall is in contact with the backrest or is spaced a specified distance or less from the backrest, the controller 130 may determine that the user does not want the unfolding of the partition wall and thus may stop the unfolding of the partition wall.

For example, the controller 130 may monitor an unfolding angle of the partition wall using the sensor part. The unfolding angle of the partition wall may be angle by which the partition wall is unfolded from the backrest. For example, when it is identified that the partition wall is unfolded by a specified angle, the controller 130 may determine that the partition wall is completely unfolded and thus may stop the unfolding of the partition wall. The specified angle may be, for example, 60 degrees to 90 degrees, but this is merely illustrative, and embodiments of the present disclosure are not limited thereto.

For example, the partition wall may be unfolded through a rotational force of the at least one spring hinge. As an example, while the first seat is being folded, the first seat is unfolded by the at least one hinge connecting the backrest and the partition wall, and the unfolding may be stopped at a specified unfolding angle by the angle adjusting device.

For example, the partition wall may be fixedly coupled to the backrest through a locking device on the other side opposite to one side on which the angle adjusting device is disposed, based on a user input of a specified pressure on the one surface of the partition wall. In other words, when a specified pressure greater than the rotational force of the at least one spring hinge is applied to the one surface of the partition wall, the partition wall may be folded in a direction opposite to a direction in which the partition wall is unfolded. In this case, when the partition wall is folded until the partition wall comes into contact with the backrest, the partition wall may be coupled to the backrest by the locking device.

For example, when receiving an unfolding input for the first seat, the controller 130 may unfold the first seat using the driving part 110. As an example, when the first seat is unfolded (or completely unfolded), the coupling between the partition wall and the backrest may be released by an unlocking device disposed on one area of an accommodation space of the seatback of the first seat.

For example, while the first seat is unfolded, the partition wall may be folded in a direction toward the backrest due to a pressure for the angle adjusting device. In this case, the partition wall may be gradually folded in proportion to the size of an angle by which the first seat is unfolded.

For example, a damper may be further disposed between the partition wall and the seatback. As an example, a speed at which the partition wall is unfolded may be gently adjusted by the damper. In other words, after the partition wall is unfolded to an angle (e.g., 80 degrees) immediately before a maximum unfolding angle (e.g., 90 degrees), while the partition wall is unfolded to the maximum unfolding angle, the unfolding speed of the partition wall may be gradually decreased by the damper.

For example, descriptions of the at least one spring hinge, the angle adjusting device, the locking device, the unlocking device, and the damper are described below in descriptions of FIGS. 3A-3F.

For example, the controller 130 may control the display part formed on the one surface of the partition wall. As an example, the controller 130 may provide at least one content to the user sitting on the second seat using the display part provided to face the second seat.

For example, after the first seat is folded and the partition wall is unfolded, when receiving the unfolding input for the first seat, the controller 130 may unfold the first seat using the driving part 110. As an example, while the first seat is being unfolded, the controller 130 may fold the partition wall using the gear and the motor such that the other surface opposite to the one surface of the partition wall moves to a direction in contact with the backrest.

The components of the seat controlling apparatus 100 illustrated in FIG. 1 are illustrative, and embodiments of the present disclosure are not limited thereto. For example, the seat controlling apparatus 100 may further include at least one of a sensor part, a display part, or any combination thereof.

For example, the sensor part may include at least one sensing device that identifies at least one of the separation distance (or contact) between the partition wall and the backrest, the unfolding angle of the partition wall, a folding angle of the seat, or any combination thereof.

For example, the display part may include at least one output device disposed on the one surface of the partition wall.

Figure 2:
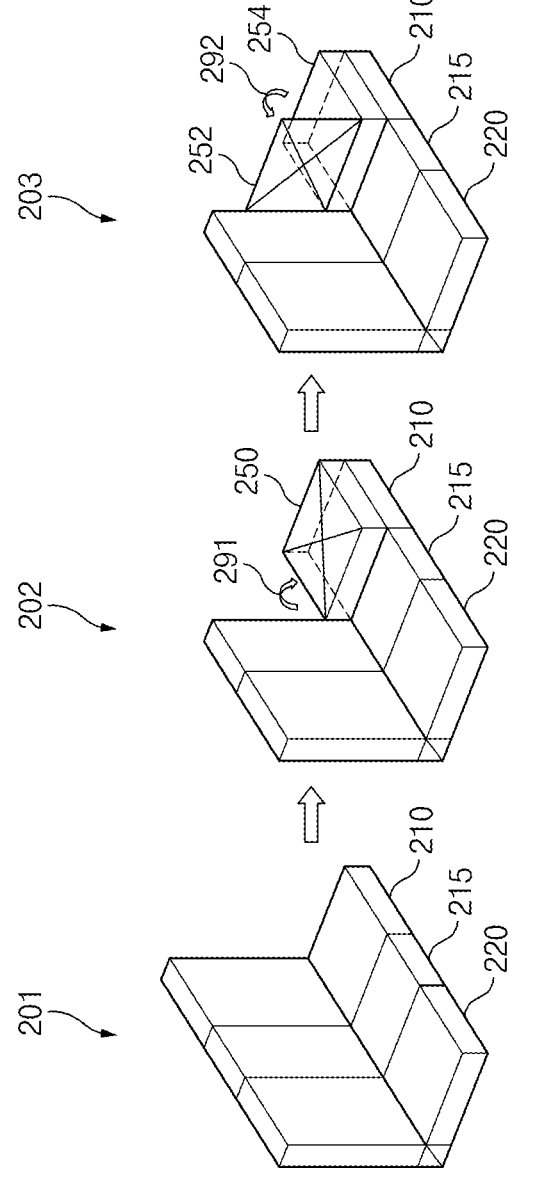
FIG. 2 is a conceptual view illustrating a mechanism of unfolding a partition wall according to an operation of folding a seat according to the embodiment of the present disclosure.

FIG. 2 is a conceptual view illustrating a mechanism of unfolding a partition wall according to an operation of folding a seat according to the embodiment of the present disclosure.

According to the embodiment, a seat controlling apparatus (e.g., the seat controlling apparatus 100 of FIG. 1) may control a mechanism for folding a seatback (or the backrest) 254 of a first seat 210 and unfolding a partition wall 252. The first seat 210 may include a partition unfolding system 250 including the partition wall 252 and the seatback 254.

Referring to reference numeral 201, according to the embodiment, the first seat 210 and a second seat 220 may be seats in a row (e.g., a second row or third row) behind the first row, but embodiments of the present disclosure are not limited thereto.

For example, the first seat 210 may be a seat disposed behind the driver seat. An armrest console 215 and the second seat 220 may be arranged on a lateral side of the first seat 210, but the armrest console 215 is an illustrative component and thus may be omitted.

Referring to reference numeral 202, according to the embodiment, the seat controlling apparatus may fold the seatback 254 of the first seat 210 in a first direction 291 based on the reception of the folding input for the first seat 210 such that the seatback 254 comes into contact with the cushion.

Referring to reference numeral 203, according to the embodiment, the seat controlling apparatus may unfold the partition wall 252 from the seatback 254 of the first seat 210 in a second direction 292 when the partition wall satisfies the unfolding condition. Thus, the one surface of the partition wall 252 may be unfolded to face the second seat 220.

Figure 3A:
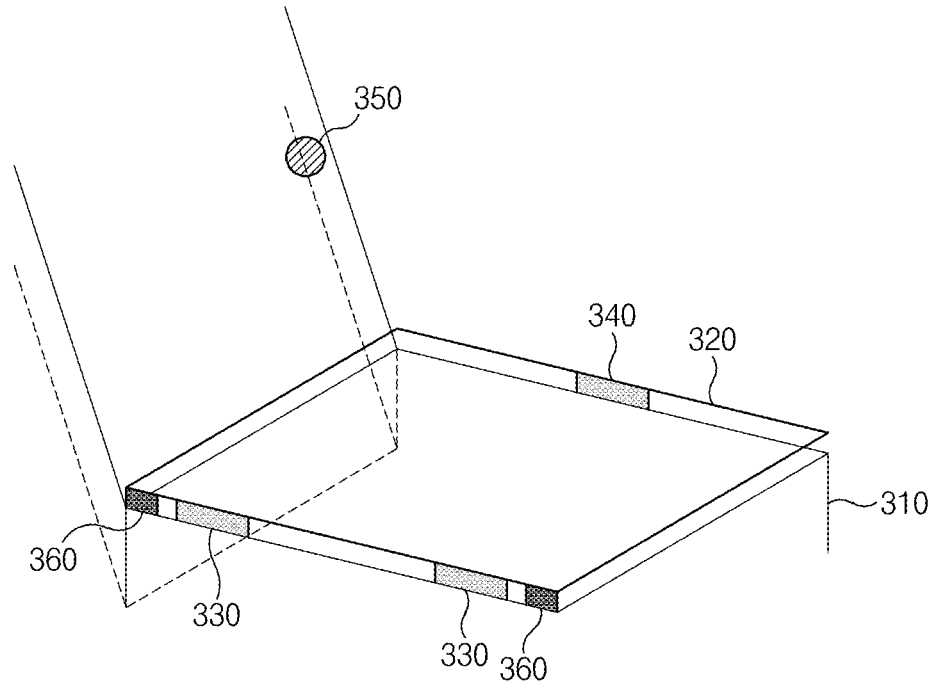
FIG. 3A is a conceptual view illustrating components of a seat controlling apparatus according to an embodiment of the present disclosure.

FIG. 3A is a conceptual view illustrating the components of the seat controlling apparatus according to the embodiment of the present disclosure.

According to the embodiment, the seat controlling apparatus (e.g., the seat controlling apparatus 100 of FIG. 1) may include various components arranged adjacent to a seatback 310 and a partition wall 320. For example, the seat controlling apparatus may include at least one spring hinge 330, a locking device 340, an unlocking device 350, and at least one angle adjusting device 360.

For example, a state illustrated in FIG. 3A may be a state in which the seatback 310 of the first seat is folded in contact with the cushion and the partition wall is not unfolded based on the reception of the folding input for the first seat.

Figure 3B:
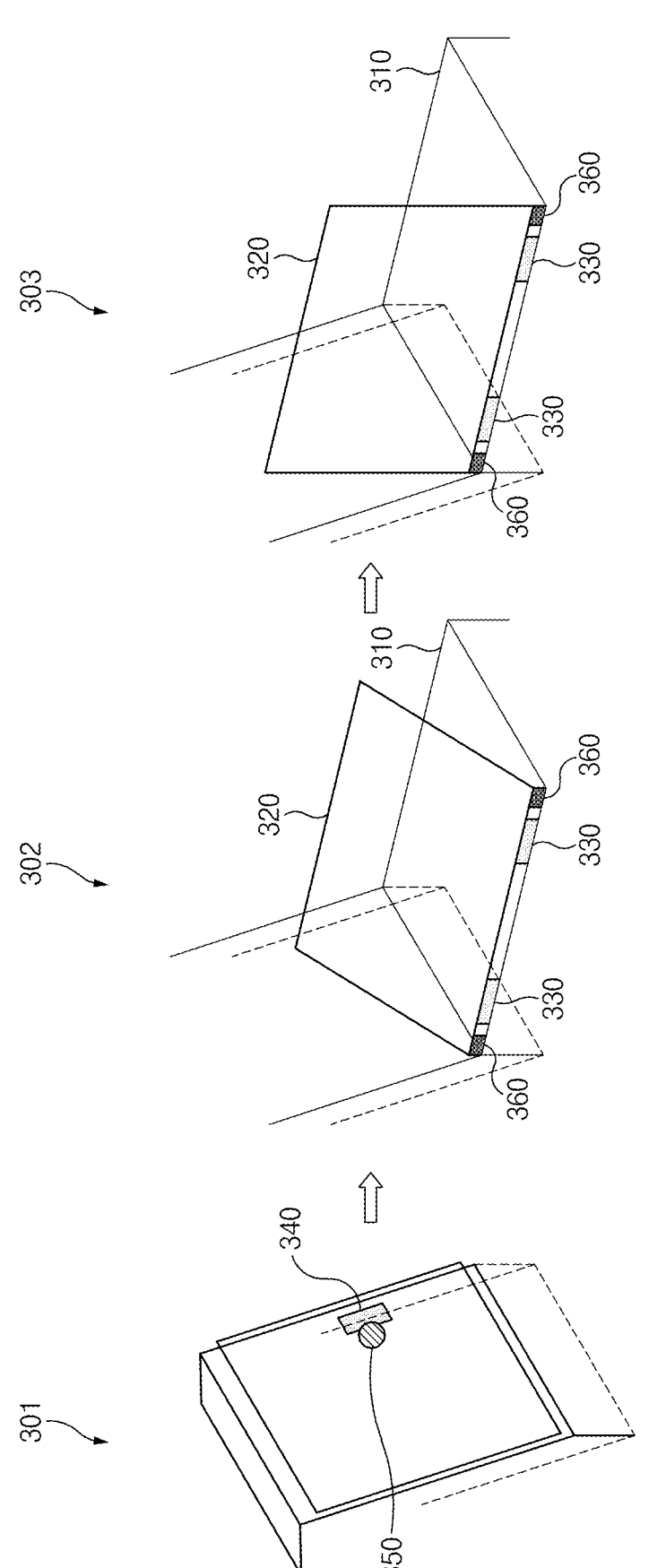
FIG. 3B is a conceptual view illustrating components of a seat controlling apparatus and a mechanism of unfolding a partition wall according to an embodiment of the present disclosure.

FIG. 3B is a conceptual view illustrating the components of the seat controlling apparatus and a mechanism of unfolding the partition wall according to the embodiment of the present disclosure.

Referring to reference numeral 301, according to the embodiment, the first seat may accommodate the partition wall 320 behind the seatback 310 in a non-folded state. For example, the seatback 310 may be fixed to or unfixed from the partition wall 320 through the locking device 340 and the unlocking device 350. A state indicated by reference numeral 301 may be a state in which locking of the locking device 340 is released by the unlocking device 350.

Referring to reference numeral 302, according to the embodiment, as the folding input for the first seat is received, the seatback 310 of the first seat may be completely folded. As an example, while (or after) the seatback 310 is folded, the partition wall 320 may be gradually unfolded by a rotational force (e.g., a coil spring force) of the at least one spring hinge 330.

Referring to reference numeral 302, according to the embodiment, the unfolding of the partition wall 320 may be stopped by the at least one angle adjusting device 360. For example, when the partition wall 320 is unfolded at the specified unfolding angle, the at least one angle adjusting device 360 may stop the rotation through a greater force than the rotational force of the at least one spring hinge 330 and thus may stop the unfolding of the partition wall 320.

Figure 3C:
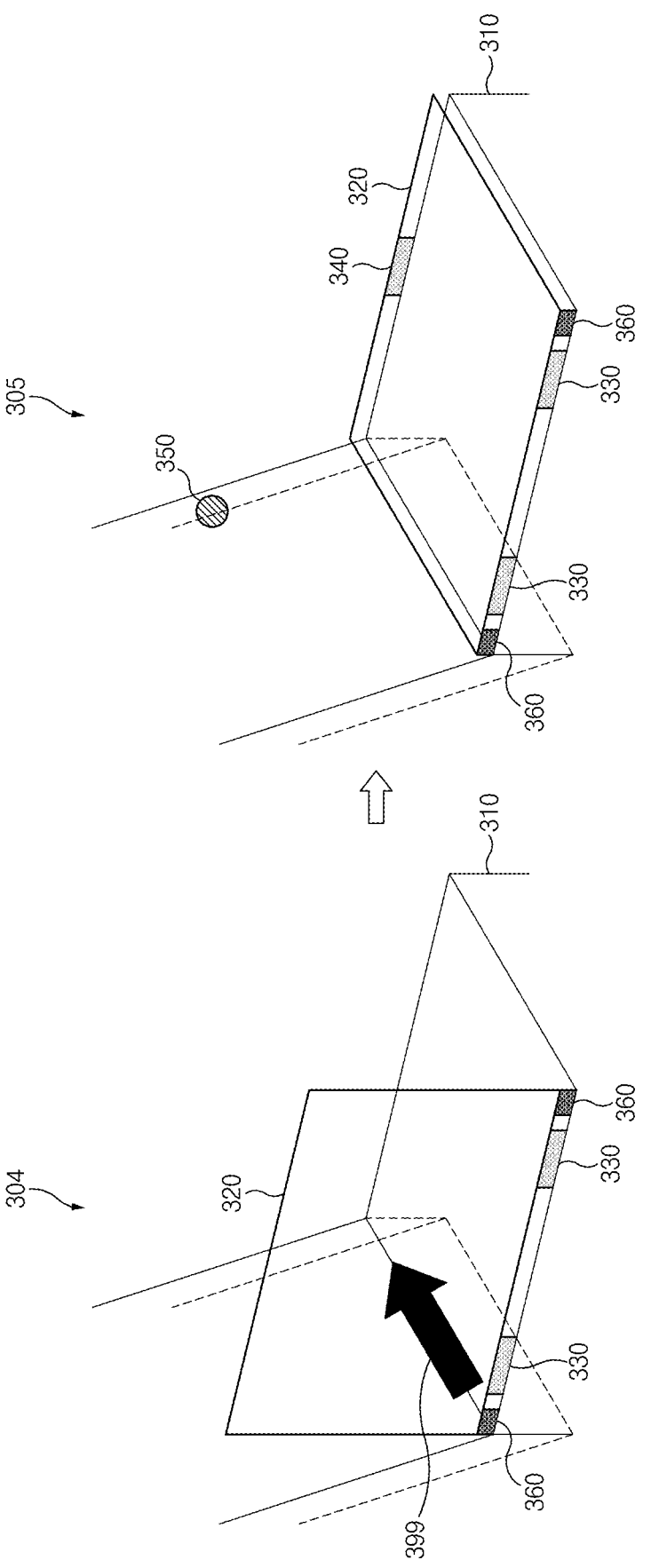
FIG. 3C is a conceptual view illustrating components of a seat controlling apparatus and a mechanism of folding a partition wall by user input according to an embodiment of the present disclosure.

FIG. 3C is a conceptual view illustrating the components of the seat controlling apparatus and a mechanism of folding the partition wall by user input according to the embodiment of the present disclosure.

Referring to reference numeral 304, according to the embodiment, in a state in which the partition wall 320 is unfolded, a user input 399 having a specified pressure may be applied to the one surface of the partition wall 320.

Referring to reference numeral 305, according to the embodiment, when the specified pressure is greater than the rotational force of the at least one spring hinge 330, the partition wall 320 may be folded in a direction opposite to the unfolded direction. For example, when the partition wall 320 is completely folded in contact with the seatback 310, the partition wall 320 and the seatback 310 may be fixedly coupled to each other through the locking device 340.

Figure 3D:
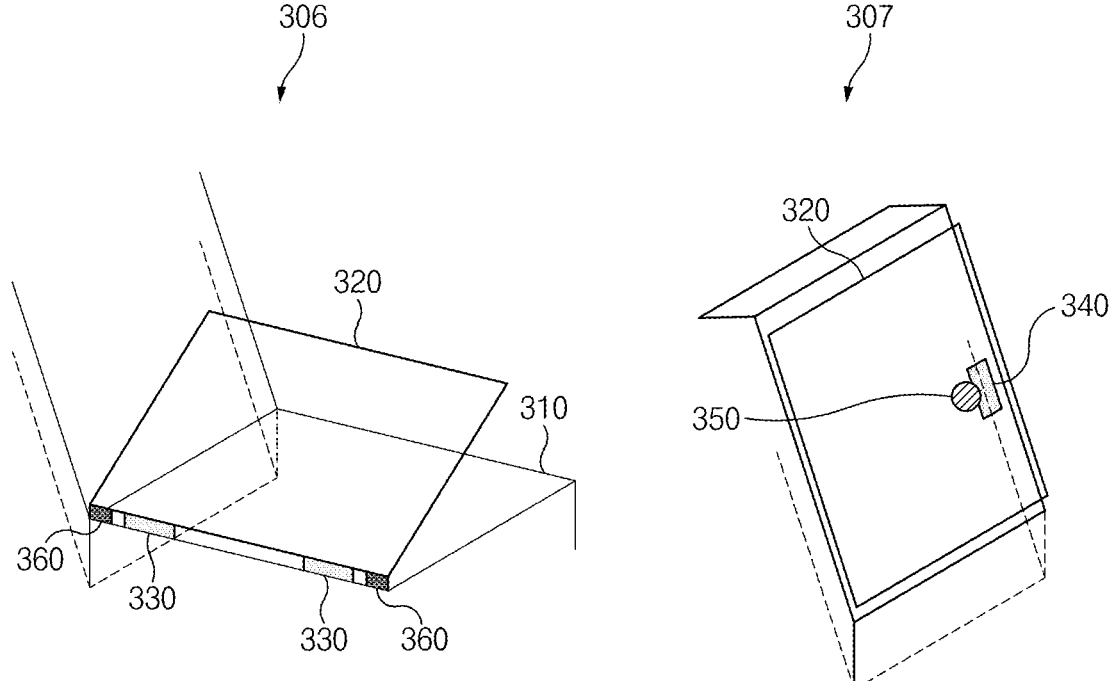
FIG. 3D is a conceptual view illustrating a mechanism of folding components and a partition wall of a seat controlling apparatus according to an embodiment of the present disclosure.

FIG. 3D is a conceptual view illustrating the components of the seat controlling apparatus and a mechanism of folding the partition wall according to the embodiment of the present disclosure.

Referring to reference numeral 306, according to the embodiment, when receiving the unfolding input for the first seat, the seat controlling apparatus may unfold the seatback 310 of the first seat. In this case, as the seatback 310 is unfolded, the partition wall 320 may be folded in a direction opposite to the unfolding direction due to an external force by a component (e.g., a protrusion part of the accommodation space or a separate component) adjacent to the at least one angle adjusting device 360. Thereafter, the partition wall 320 may be completely folded and fixedly coupled to the seatback 310 through the locking device 340.

Referring to reference numeral 307, according to the embodiment, when the seatback 310 is completely unfolded, the locked state by the locking device 340 may be released by the unlocking device 350. Through the unlocking, when the seatback 310 is folded thereafter, the partition wall 320 may be automatically and gradually unfolded.

Figure 3E:
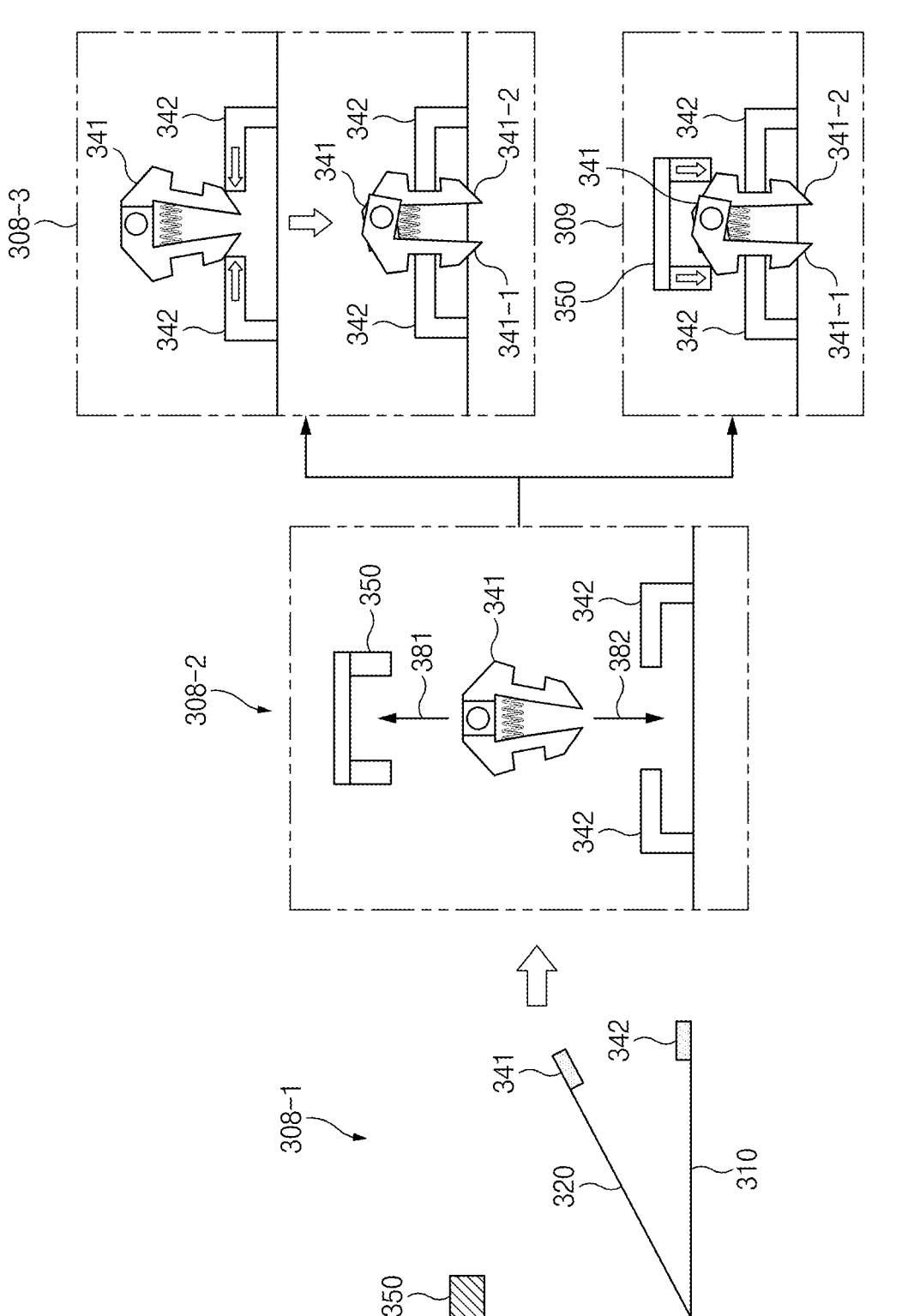
FIG. 3E is a conceptual view illustrating operations of a locking device and an unlocking device according to an embodiment of the present disclosure.

FIG. 3E is a conceptual view illustrating operations of a locking device and an unlocking device according to the embodiment of the present disclosure.

Referring to a reference numeral 308-1, according to the embodiment, when an external force (e.g., a user input having a specified pressure on one surface) is applied after the partition wall 320 is unfolded in a state in which the seatback 310 is completely folded, the partition wall 320 may be folded toward the seatback 310. In this case, the partition wall 320 and the seatback 310 may be fixedly coupled to each other due to the coupling between a first locking device (e.g., a latch part) 341 and a second locking device (e.g., a ring part) 342.

Referring to reference numeral 308-2, according to the embodiment, when the partition wall 320 is unfolded in a state in which the first seat is unfolded, the first locking device 341 may be moved in a first direction 381 toward the unlocking device 350. According to the embodiment, when the partition wall 320 is folded in a state in which the first seat is folded, the first locking device 341 may be moved in a second direction 382 toward the second locking device 342.

Referring to reference numeral 308-3, according to the embodiment, after the partition wall 320 is unfolded in a state in which the seatback 310 is folded, when the partition wall 320 is folded toward the seatback 310 due to an external force on the partition wall 320, latch portions 341-1 and 341-2 of the first locking device 341 are fastened to a ring portion of the second locking device 342. As a result, the partition wall 320 and the seatback 310 may be fixedly coupled to each other.

Referring to reference numeral 309, according to the embodiment, when the seatback 310 is completely unfolded, the unlocking device 350 applies a pressure to the first locking device 341, the latch portions 341-1 and 341-2 are separated from the ring portion of the second locking device 342 due to the pressure, and the locking is released. As a result, the partition wall 320 and the seatback 310 may be unfixed from each other.

Figure 3F:
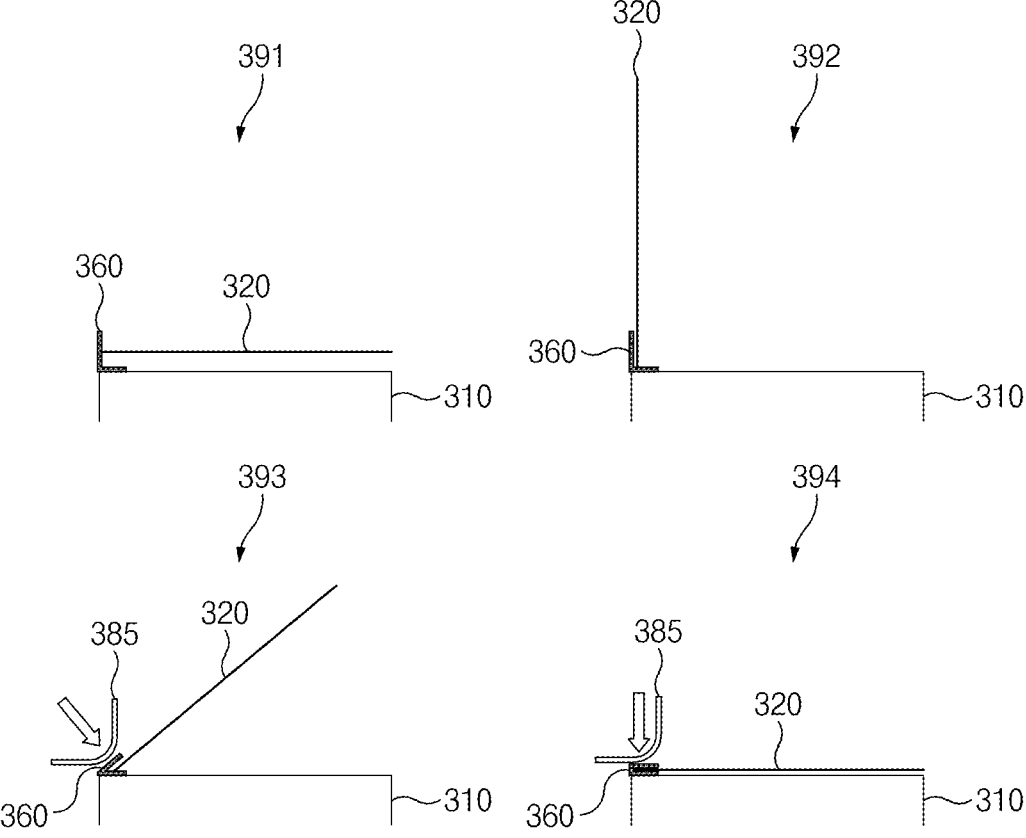
FIG. 3F is a conceptual view illustrating an operation of an angle adjusting device according to an embodiment of the present disclosure.

FIG. 3F is a conceptual view illustrating an operation of an angle adjusting device according to the embodiment of the present disclosure.

Referring to reference numeral 391, according to the embodiment, the partition wall 320 may be folded in contact with the seatback 310 in a non-unfolded state. This state may be, for example, a state in which the first seat is unfolded.

Referring to reference numeral 392, according to the embodiment, the partition wall 320 may be maintained in an unfolded state. This state may be, for example, a state in which the first seat is folded. For example, the unfolding angle of the partition wall 320 may be limited by the at least one angle adjusting device 360.

Referring to reference numeral 393, according to the embodiment, when the unfolding input for the first seat is received in a state in which the partition wall 320 is completely unfolded, the at least one angle adjusting device 360 may be folded due to an external force by a component 385 (e.g., a protrusion part, a portion of the accommodation space of the seatback 310, or the like) adjacent to the at least one angle adjusting device 360 while the seatback 310 is unfolded. Accordingly, while the seatback 310 is unfolded, an unfolding angle of the partition wall 320 may be gradually decreased.

Referring to reference numeral 394, according to the embodiment, when the unfolding operation for the first seat is completed, the at least one angle adjusting device 360 may be completely folded due to an external force by the component 385 adjacent to the at least one angle adjusting device 360. Accordingly, the partition wall 320 may be folded in contact with the seatback 310.

Figure 4A:
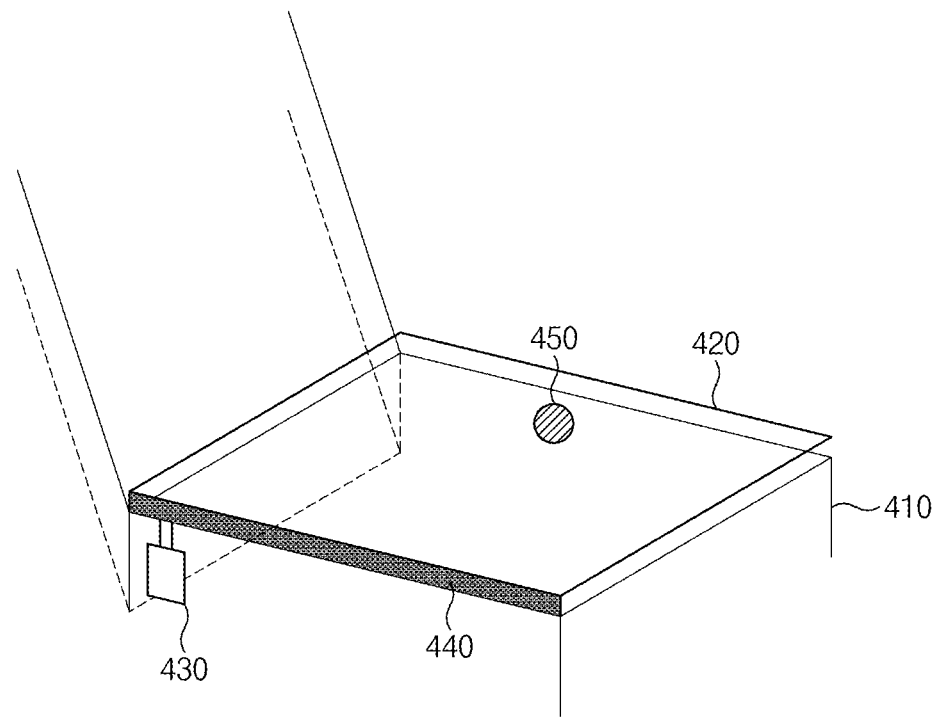
FIG. 4A is a conceptual view illustrating components of a seat controlling apparatus according to an embodiment of the present disclosure.

FIG. 4A is a conceptual view illustrating the components of the seat controlling apparatus according to the embodiment of the present disclosure.

According to the embodiment, the seat controlling apparatus (e.g., the seat controlling apparatus 100 of FIG. 1) may include components for controlling positions of a seatback 410 and a partition wall 420. For example, the seat controlling apparatus may include a motor 430, a gear 440, and a sensor 450.

For example, as illustrated, the gear 440 may be disposed between the first side of the seatback 410 (or the backrest) and the second side of the partition wall 420 of the first seat. The partition wall 420 may be unfolded by rotation of the gear 440 while the second side is set as a rotation axis.

For example, the seat controlling apparatus may drive the motor 430 to unfold the partition wall 420. The gear 440 may be rotated based on the driven motor 430.

For example, the seat controlling apparatus may identify a separation distance and/or contact between the partition wall 420 and the seatback 410 using the sensor 450. As an example, the seat controlling apparatus may monitor an unfolding angle of the partition wall 420 using the sensor 450.

Figure 4B:
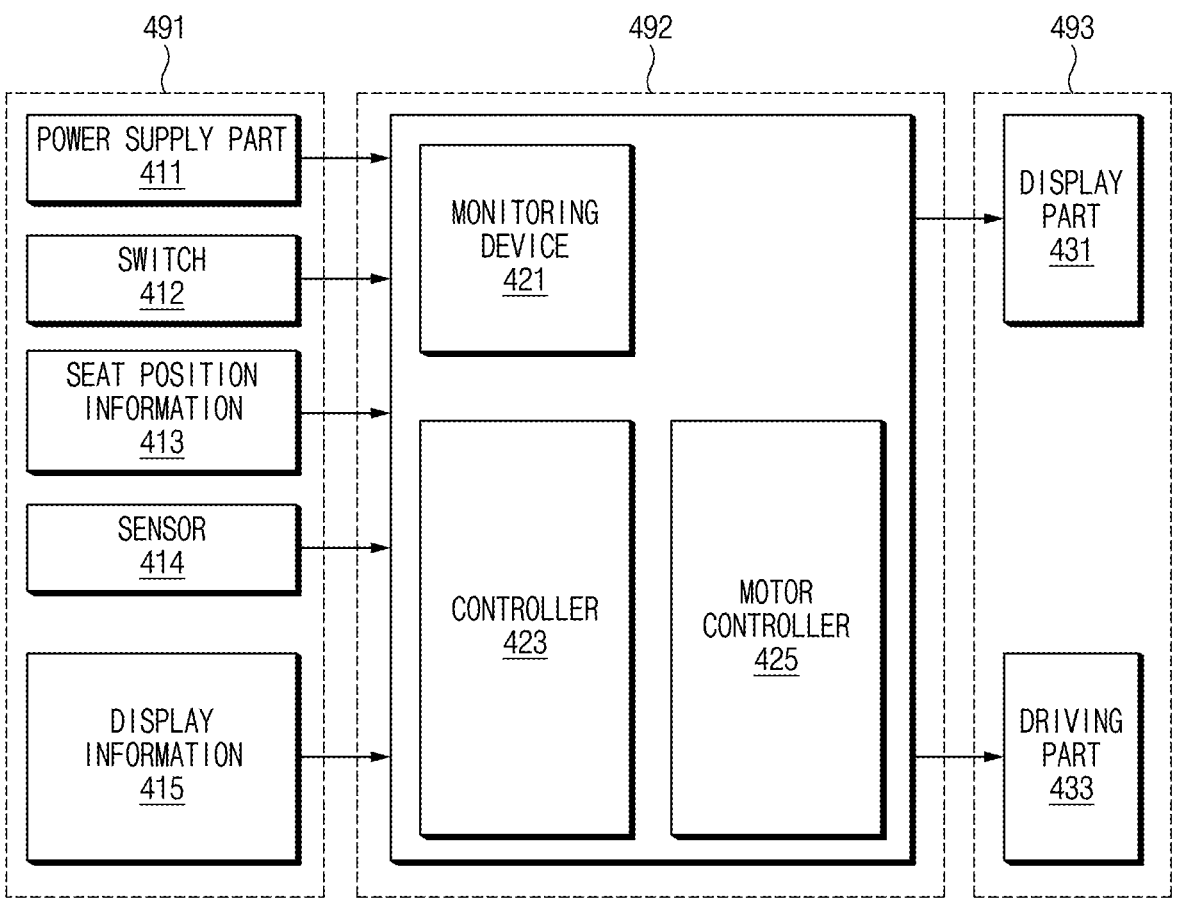
FIG. 4B is a conceptual view illustrating components of a seat controlling apparatus according to an embodiment of the present disclosure.

FIG. 4B is a conceptual view illustrating the components of the seat controlling apparatus according to the embodiment of the present disclosure.

According to the embodiment, the seat controlling apparatus (e.g., the seat controlling apparatus 100 of FIG. 1) may include: a power supply part 411; a switch 412; a sensor 414; a monitoring device 421; a controller 423; a motor controller 425; a display part 431; and a driving part 433. The seat controlling apparatus may control the seat and the partition wall through operations of an input part indicated by reference numeral 491, a determination part indicated by reference numeral 492, and an output part indicated by reference numeral 493.

For example, the seat controlling apparatus may be operated through the power of the power supply part 411. For example, the seat controlling apparatus may control the seat and/or the partition wall based on an input for the switch 412 (e.g., a partition wall unfolding input, a partition wall accommodating input, a seat folding input, a seat unfolding input, or the like).

For example, the seat controlling apparatus may acquire seat position information 413 indicating the position (or the state) of the seat and/or display information 415 through the sensor 414 and/or a communication part. As an example, the display information 415 may include real-time weather, a travel distance of the vehicle itself, a remaining travel time to a destination, or the like.

For example, the seat controlling apparatus may monitor, using the monitoring device 421, various pieces of information (e.g., the position of the seat, the folding angle, a position of the partition wall, an unfolding angle or the like) acquired through the sensor 414 in real time.

For example, the seat controlling apparatus may determine whether the partition wall is unfolded using the controller 423 based on information acquired through the input part 491. As an example, when it is determined to unfold the partition wall, the seat controlling apparatus may operate the driving part 433 using the motor controller 425. For example, the seat controlling apparatus may control the folding and the unfolding of the seat and the partition wall by operating the driving part 433.

For example, the seat controlling apparatus may provide various visual and/or auditory contents to the user using the display part 431 disposed in one area of the partition wall.

Figure 5:
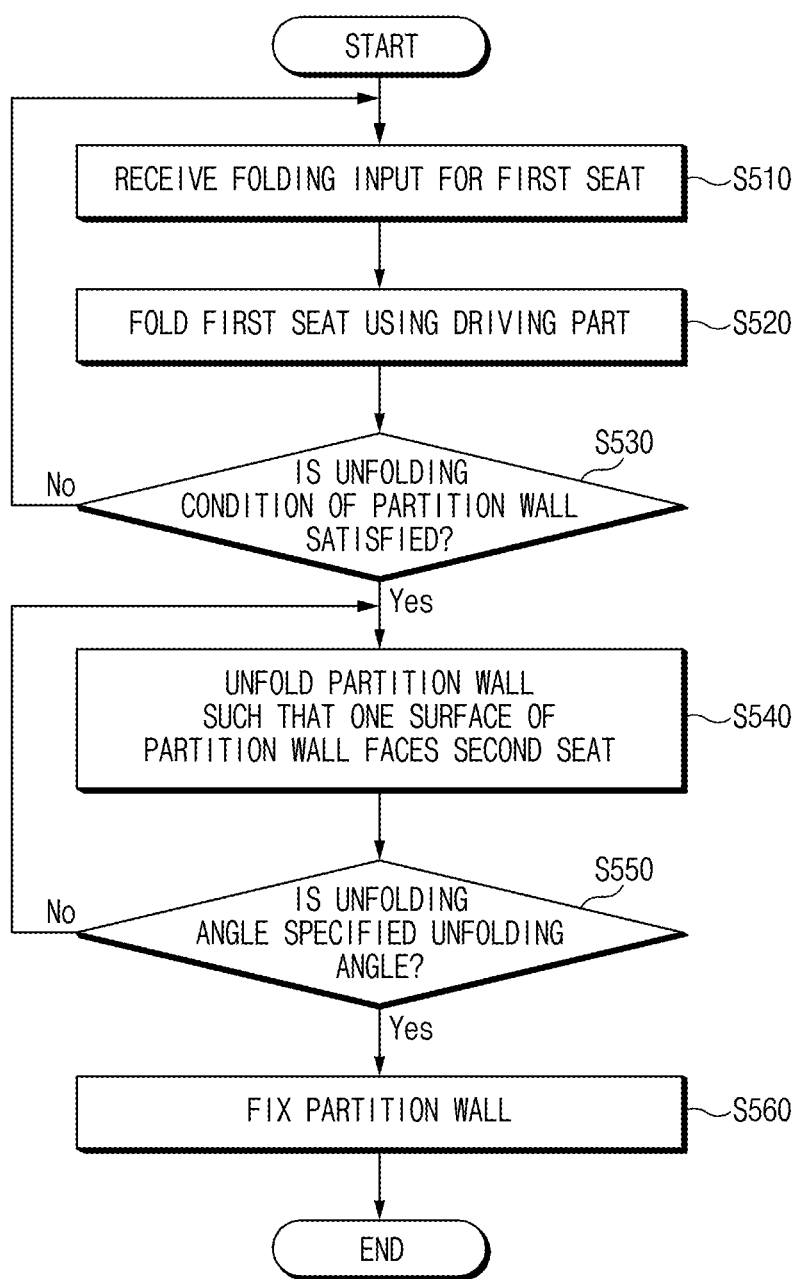
FIG. 5 is a flowchart of a seat controlling method according to an embodiment of the present disclosure.

FIG. 5 is a flowchart of a seat controlling method according to the embodiment of the present disclosure.

According to the embodiment, the seat controlling apparatus (e.g., the seat controlling apparatus 100 of FIG. 1) may perform operations disclosed in FIG. 5. For example, at least some of the components (e.g., the driving part 110, the memory 120, and the controller 130 of FIG. 1) included in the seat controlling apparatus may be set to perform the operations of FIG. 5.

In the following embodiment, operations S510 to S560 may be performed sequentially but are not necessarily performed sequentially. For example, a sequence of the operations may be changed, and at least two operations may be performed in parallel. Further, the content that corresponds to or overlaps with the above description in relation to FIG. 5 may be briefly described or omitted.

According to the embodiment, the seat controlling apparatus may receive the folding input for the first seat (S510).

According to the embodiment, the seat controlling apparatus may fold the first seat using the driving part (S520).

According to the embodiment, the seat controlling apparatus may determine whether the partition wall satisfies the unfolding condition (S530).

For example, when the partition wall satisfies the unfolding condition (e.g., operation S530—Yes), the seat controlling apparatus may perform operation S540.

For example, when the partition wall does not satisfy the unfolding condition (e.g., operation S530—No), the seat controlling apparatus may repeatedly perform operation S510.

According to the embodiment, the seat controlling apparatus may unfold the partition wall so that the one surface of the partition wall faces the second seat (S540).

According to the embodiment, the seat controlling apparatus may determine whether the unfolding angle of the partition wall is the specified unfolding angle (S550).

For example, when the unfolding angle of the partition wall is the specified unfolding angle (e.g., operation S550—Yes), the seat controlling apparatus may perform operation S560.

For example, when the unfolding angle of the partition wall is not the specified unfolding angle (e.g., operation S550—No), the seat controlling apparatus may repeatedly perform operation S540.

According to the embodiment, the seat controlling apparatus may fix the partition wall (S560).

For example, the seat controlling apparatus may stop the unfolding of the partition wall and fix the partition wall.

Figure 6:
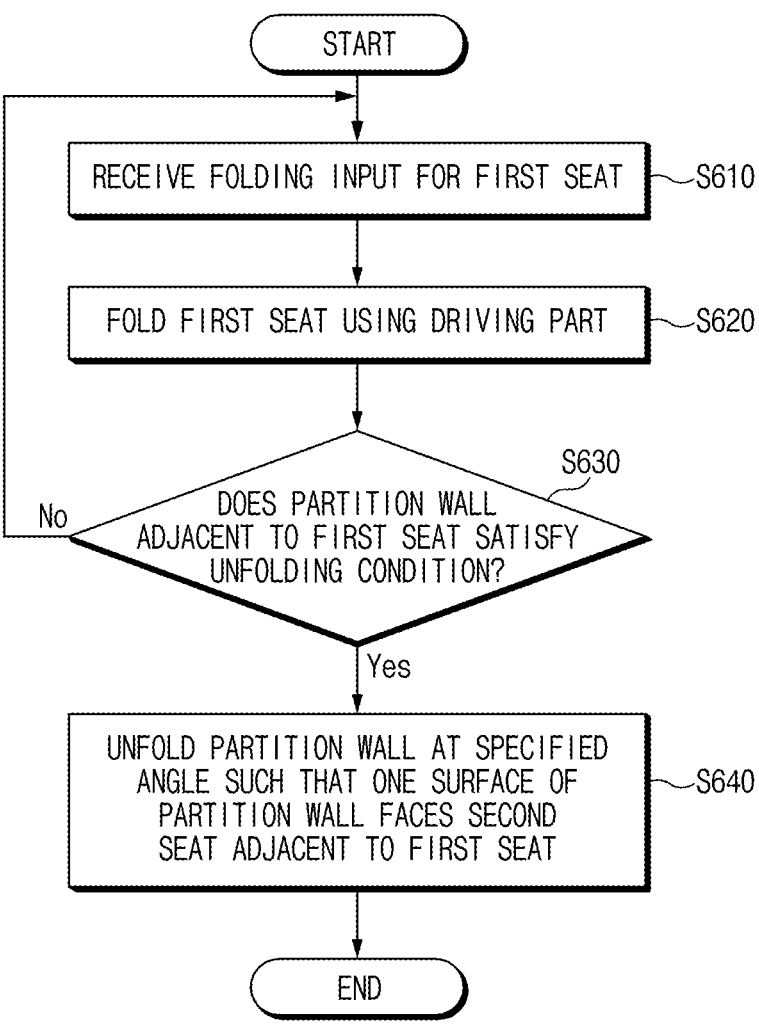
FIG. 6 is a flowchart of a seat controlling method according to an embodiment of the present disclosure.

FIG. 6 is a flowchart of a seat controlling method according to the embodiment of the present disclosure.

According to the embodiment, the seat controlling apparatus (e.g., the seat controlling apparatus 100 of FIG. 1) may perform operations disclosed in FIG. 6. For example, at least some of the components (e.g., the driving part 110, the memory 120, and the controller 130) included in the seat controlling apparatus may be set to perform operations of FIG. 6.

In the following embodiment, operations S610 to S640 may be performed sequentially but are not necessarily performed sequentially. For example, a sequence of the operations may be changed, and at least two operations may be performed in parallel. Further, the content that corresponds to or overlaps with the above description in relation to FIG. 6 may be briefly described or omitted.

According to the embodiment, the seat controlling apparatus may receive the folding input for the first seat (S610).

According to the embodiment, the seat controlling apparatus may fold the first seat using the driving part (S620).

According to the embodiment, the seat controlling apparatus may determine whether the partition wall adjacent to the first seat satisfies the unfolding condition (S630).

For example, the seat controlling apparatus may determine whether the partition wall disposed on a rear surface of the seatback of the first seat satisfies the unfolding condition.

For example, when the partition wall satisfies the unfolding condition (e.g., operation S630—Yes), the seat controlling apparatus may perform operation S640.

For example, when the partition wall does not satisfy the unfolding condition (e.g., operation S630—No), the seat controlling apparatus may repeatedly perform operation S610.

According to the embodiment, the seat controlling apparatus may unfold the partition wall at a specified angle so that the one surface of the partition wall faces the second seat adjacent to the first seat (S640).

Figure 7:
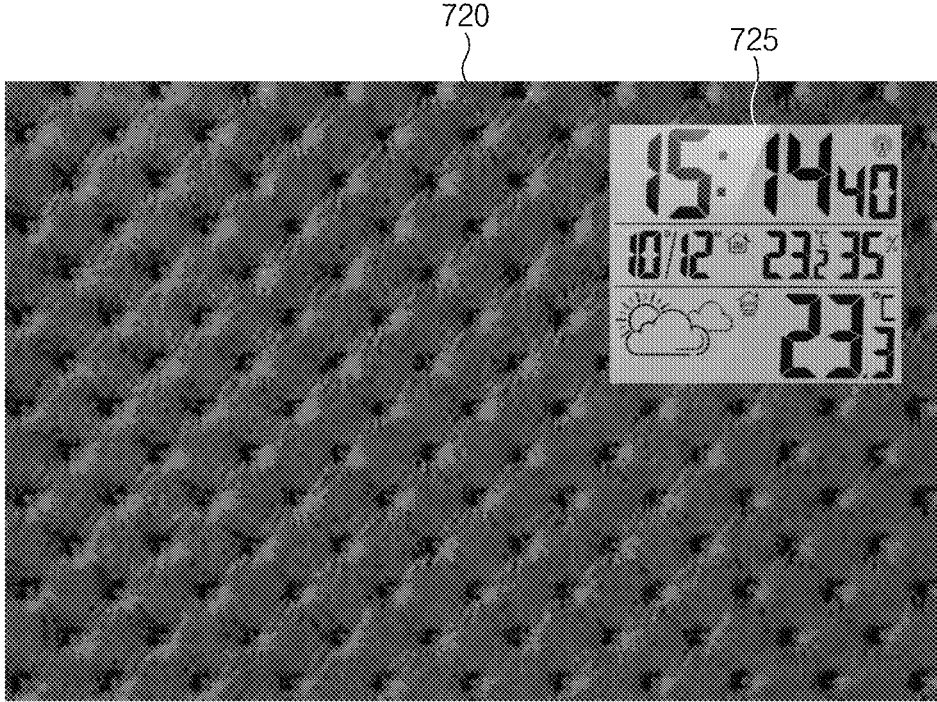
FIG. 7 is a conceptual view illustrating a display part provided in an area of a partition wall according to an embodiment of the present disclosure.

FIG. 7 is a conceptual view illustrating a display part provided in an area of the partition wall according to the embodiment of the present disclosure.

According to the embodiment, a display part 725 may be disposed on one area of one surface of a partition wall 720.

For example, the seat controlling apparatus (e.g., the seat controlling apparatus 100 of FIG. 1) may provide various pieces of visual information (e.g., a real-time time, a date, a weather, a temperature, a humidity, a content, or the like) to the user using the display part 725.

Figure 8:
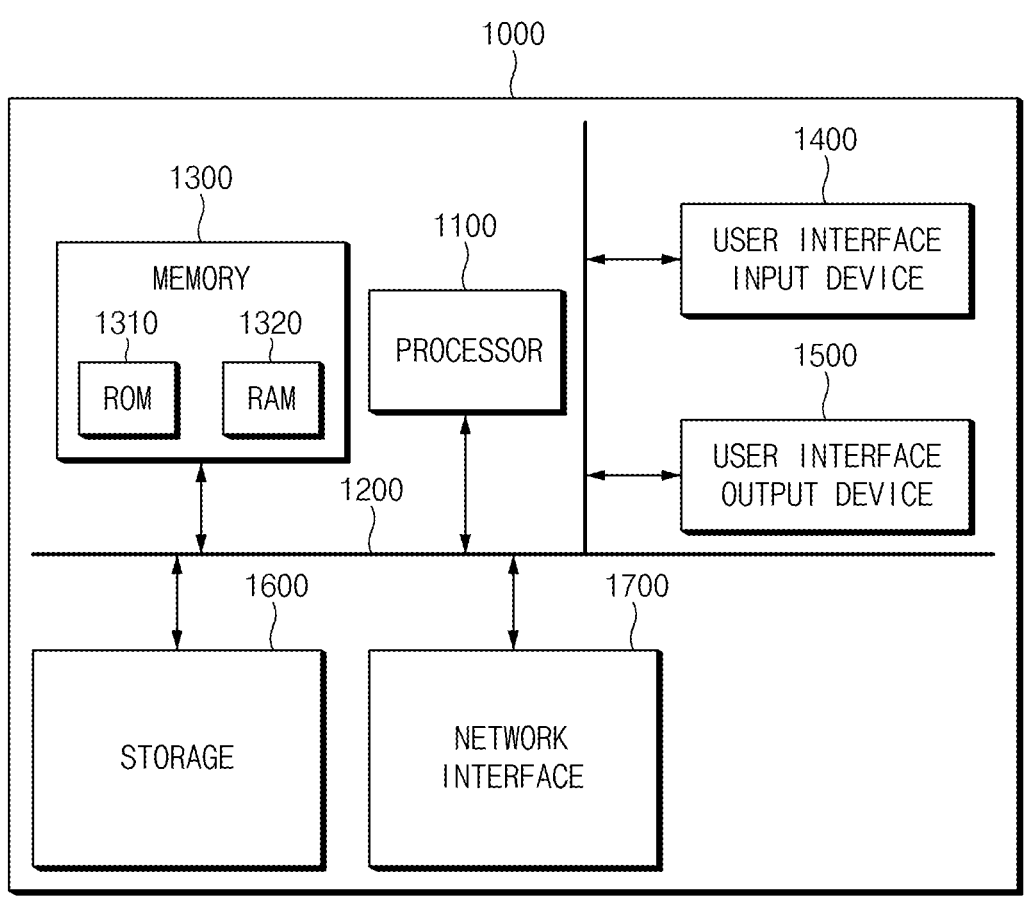
FIG. 8 illustrates a computing system related to a seat controlling apparatus or a seat controlling method according to an embodiment of the present disclosure.

FIG. 8 illustrates a computing system related to the seat controlling apparatus or the seat controlling method according to the embodiment of the present disclosure.

Referring to FIG. 8, a computing system 1000 for the seat controlling method may include: at least one processor 1100; a memory 1300; a user interface input device 1400; a user interface output device 1500; a storage 1600; and a network interface 1700, which are connected through a bus 1200.

The processor 1100 may be a central processing unit (CPU) or a semiconductor device that processes commands stored in the memory 1300 and/or storage 1600. The memory 1300 and the storage 1600 may include various types of volatile or nonvolatile storage media. For example, the memory 1300 may include a read only memory (ROM) and a random access memory (RAM).

Thus, operations of a method or algorithm described in connection with the embodiments disclosed herein may be directly implemented in hardware, a software module, or a combination of the two components, which are executed by the processor 1100. The software module may reside in a storage medium (i.e., the memory 1300 and/or the storage 1600) such as a random access memory (RAM), a flash memory, a read-only memory (ROM), an erasable programmable ROM (EPROM), an electrically erasable programmable ROM (EEPROM), a register, a hard disk, a removable disk, and a compact disk (CD)—ROM.

A storage medium may be coupled to the processor 1100, and the processor 1100 may read information from the storage medium and write information in the storage medium. In another manner, the storage medium may be integrated with the processor 1100. The processor and the storage medium may reside inside an application-specific integrated circuit (ASIC). The ASIC may reside inside a user terminal. In still another manner, the processor and the storage medium may reside as an individual component inside the user terminal.

The effects of a seat controlling apparatus and a method therefor according to the present disclosure are described below.

Embodiments of the present disclosure provide a seat controlling apparatus that provides a luxurious and cozy space sense to a user sitting on a seat (e.g., a seat behind a passenger seat) adjacent to a specified seat behind a driver seat among two-row seats. This is achieved by unfolding a partition wall disposed on a rear surface of a seatback of the specified seat when the specified seat is folded.

Embodiments of the present disclosure also provide a seat controlling apparatus that selectively provides a partition wall according to the intention of a user by fixing the partition wall to a rear surface of the seatback of a specified seat when the user applies a pressure input to the partition wall.

Embodiments of the present disclosure also provide a seat controlling apparatus that unfolds a partition wall to divide a space between a specified seat and a seat behind a driver seat. Thus, the embodiments provide a personal space sense to a user sitting on a seat behind a passenger seat and provide luxurious and comfortable usability for a rear seat.

In addition, various effects directly or indirectly identified through the present document may be provided.

The above description is merely illustrative of the technical spirit of the present disclosure, and those having ordinary skill in the art to which the present disclosure belongs may make various modifications and changes without departing from the essential features of the present disclosure.

Thus, the embodiments disclosed in the present disclosure are not intended to limit the technology spirit of the present disclosure but are intended to describe the present disclosure. Additionally, the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A seat controlling apparatus comprising:
a driving part;
one or more processors;
a memory storing instructions that, when executed by the one or more processors, cause the seat controlling apparatus to:
fold a first seat using the driving part when receiving a folding input for the first seat;
determine whether a partition wall adjacent to the first seat satisfies an unfolding condition while the first seat is being folded;
when the partition wall satisfies the unfolding condition, unfold the partition wall such that one surface of the partition wall faces a second seat adjacent to the first seat;
at least one spring hinge connecting a backrest of the first seat and the partition wall; and
an angle adjusting device disposed between the backrest and the partition wall,
wherein the partition wall is unfolded by the at least one spring hinge, and the unfolding of the partition wall is stopped at a specified unfolding angle by the angle adjusting device when the unfolding condition is satisfied,
wherein the partition wall is fixedly coupled to the backrest through a locking device on a first side opposite to a second side on which the angle adjusting device is disposed, based on user input having a specified pressure on the one surface,
wherein, when the instructions are executed by the one or more processors, the seat controlling apparatus is configured to unfold the first seat using the driving part when receiving an unfolding input for the first seat,
wherein the coupling between the partition wall and the backrest is released through an unlocking device adjacent to the locking device when the first seat is unfolded,
wherein, when the instructions are executed by the one or more processors, the seat controlling apparatus is configured to unfold the first seat using the driving part when receiving the unfolding input for the first seat, and
wherein, while the first seat is being unfolded, the partition wall is folded in proportion to an angle at which the first seat is unfolded through a pressure on the angle adjusting device.

2. The seat controlling apparatus of claim 1, further comprising a damper,
wherein a speed at which the partition wall is unfolded is gently adjusted by the damper.

3. The seat controlling apparatus of claim 1, wherein, when the instructions are executed by the one or more processors, the seat controlling apparatus is configured to determine that the folding input is received when receiving a switch input for folding the first seat from a user or identifying that the first seat is folded by the user.

4. The seat controlling apparatus of claim 1, wherein the driving part includes a gear disposed between a first side of a backrest of the first seat and a second side of the partition wall and a motor configured to rotate the gear, and
wherein, when the instructions are executed by the one or more processors, the seat controlling apparatus is configured to unfold the partition wall using the gear and the motor when the partition wall satisfies the unfolding condition.

5. The seat controlling apparatus of claim 1, further comprising:
a sensor part disposed between the partition wall and a backrest of the first seat,
wherein, when the instructions are executed by the one or more processors, the seat controlling apparatus is configured to stop the unfolding of the partition wall when it is identified using the sensor part that the partition wall is spaced a specified distance or less from the backrest.

6. The seat controlling apparatus of claim 1, further comprising a sensor part,
wherein, when the instructions are executed by the one or more processors, the seat controlling apparatus is configured to stop the unfolding of the partition wall when it is identified using the sensor part that the partition wall is unfolded at a specified angle.

7. The seat controlling apparatus of claim 1, wherein, when the instructions are executed by the one or more processors, the seat controlling apparatus is configured to determine that the partition wall does not satisfy the unfolding condition when occurrence of interference with an external object is expected when the partition wall is unfolded while the first seat is being folded.

8. The seat controlling apparatus of claim 1, wherein, when the instructions are executed by the one or more processors, the seat controlling apparatus is configured to determine that the partition wall satisfies the unfolding condition when receiving a user input for the unfolding of the partition wall while the first seat is being folded.

9. The seat controlling apparatus of claim 1, further comprising:

a display part formed on the one surface of the partition wall, wherein, when the instructions are executed by the one or more processors, the seat controlling apparatus is configured to provide at least one content to a user of the second seat using the display part provided to face the second seat.

10. The seat controlling apparatus of claim 1, wherein the driving part includes a gear disposed between a first side of a backrest of the first seat and a second side of the partition wall and a motor configured to rotate the gear, and wherein, when the instructions are executed by the one or more processors, the seat controlling apparatus is configured to:

unfold the first seat using the driving part when an unfolding input for the first seat is received after the first seat is folded and the partition wall is unfolded; and move another surface opposite to the one surface of the partition wall in a direction in contact with the backrest using the gear and the motor while the first seat is being unfolded.

11. The seat controlling apparatus of claim 1, wherein, when the instructions are executed by the one or more processors, the seat controlling apparatus is configured to:

monitor a folding angle of the first seat; and determine whether the partition wall satisfies the unfolding condition based on the monitored folding angle.

12. A seat controlling method comprising:

folding, by an apparatus, a first seat using a driving part when receiving a folding input for the first seat;

determining, by the apparatus, whether a partition wall adjacent to the first seat satisfies an unfolding condition while the first seat is being folded; and unfolding, by the apparatus, the partition wall such that one surface of the partition wall faces a second seat adjacent to the first seat when the partition wall satisfies the unfolding condition, wherein the partition wall is folded in proportion to an angle at which the first seat is unfolded through a pressure on an angle adjusting device.

13. The seat controlling method of claim 12, further comprising:

stopping, by the apparatus, the unfolding of the partition wall when it is identified using a sensor part that the partition wall is spaced a specified distance or less from a backrest of the first seat.

14. The seat controlling method of claim 12, further comprising:

stopping, by the apparatus, the unfolding of the partition wall when it is identified using a sensor part that the partition wall is unfolded at a specified angle.

15. The seat controlling method of claim 12, further comprising:

determining, by the apparatus, that the partition wall does not satisfy the unfolding condition when occurrence of interference with an external object is expected when the partition wall is unfolded while the first seat is being folded.

16. The seat controlling method of claim 12, further comprising:

unfolding, by the apparatus, the first seat using the driving part when receiving an unfolding input for the first seat after the first seat is folded and the partition wall is unfolded; and moving another surface opposite to the one surface of the partition wall in a direction in contact with a backrest of the first seat using a gear and a motor while the first seat is being unfolded.

* * * * *